W. P. DUNN AND J. W. BERESFORD.
GAME APPARATUS.
APPLICATION FILED MAY 10, 1920.

1,372,873.

Patented Mar. 29, 1921.
2 SHEETS—SHEET 1.

WITNESS:
Wm Bell

INVENTORS,
Joseph W. Beresford
and William P. Dunn,
BY
ATTORNEY

W. P. DUNN AND J. W. BERESFORD
GAME APPARATUS.
APPLICATION FILED MAY 10, 1920.
1,372,873.
Patented Mar. 29, 1921.
2 SHEETS—SHEET 2.
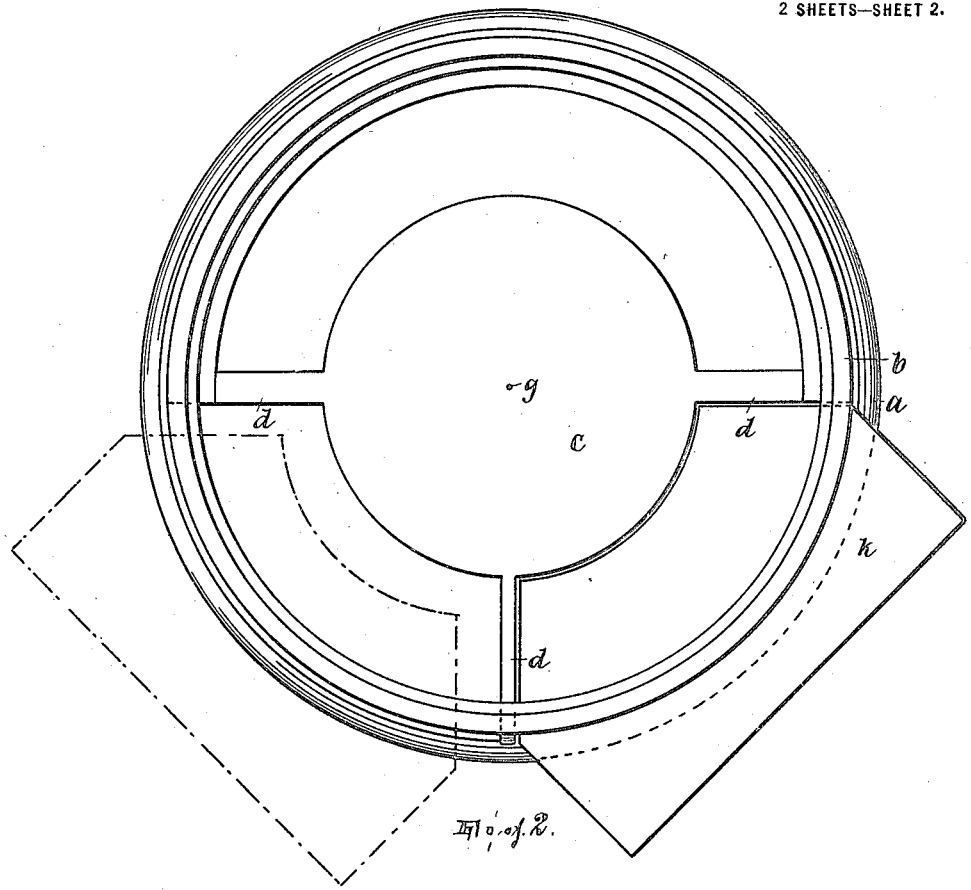
Fig. of 2.
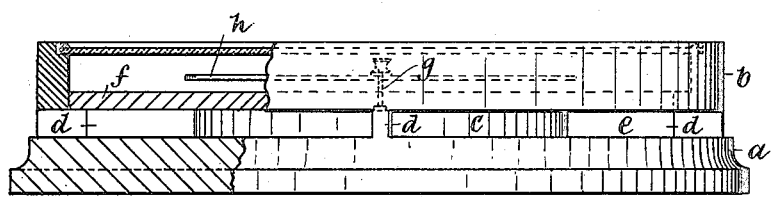
Fig. of 3.
WITNESS:
INVENTORS,
Joseph W. Beresford
and William P. Dunn,
BY
ATTORNEY.

UNITED STATES PATENT OFFICE.

WILLIAM P. DUNN AND JOSEPH WM. BERESFORD, OF PATERSON, NEW JERSEY.

GAME APPARATUS.

1,372,873. Specification of Letters Patent. Patented Mar. 29, 1921.

Application filed May 10, 1920. Serial No. 380,280.

*To all whom it may concern:*

Be it known that we, WILLIAM P. DUNN, and JOSEPH W. BERESFORD, citizens of the United States, residing at Paterson, in the county of Passaic and State of New Jersey, have invented certain new and useful Improvements in Game Apparatus, of which the following is a specification.

This invention relates to game or similar apparatus for use, for example, in telling fortunes, indicating one's horoscope and the like. According to the invention the phenomenon of magnetic attraction and also of repulsion is made use of in a novel way so as to be a source of entertainment and amusement. We provide a support having a dial with a series of indices, as numbers, letters of the alphabet, etc., with respect to which revolves freely a controlled pointer member, and we also provide a set of controlling members to be placed each near the pointer member, the controlled member and each controlling member being one a magnet and the other a magnet-attracted element. The support may and preferably does have a set of radial and radially open compartments to receive the controlling members. The pointer member is preferably a magnetic needle, while the controlling members are magnets concealed in suitable holders, each holder and its contained magnet forming what we term an actuator and some of the set of actuators being magnetically positive and the rest magnetically negative, so that the former will cause the needle to point one direction and the latter will cause it to point the oppositive direction when they are positioned near it, as in the aforesaid compartments, the actuators being preferably all of the same exterior shape and appearance so as to create the element of mystery. Each actuator may be invertible and formed so that the portions thereof on opposite sides of an axis thereof which will cross the series of indices when the actuator is placed in operative position will be reverse counterparts of each other, and its controlling member may be offset with respect to said axis, whereby when said actuator is placed in position to actuate the pointer and with one side up it will direct the pointer to one of the indices, but when it is placed in said position with the other side up it will direct the pointer to another index. Further, in two or more of the actuators their controlling members may be offset different distances from their respective axes. Having a dial with twenty-four characters, as twelve numbers and twelve letters of the alphabet, and having a magnetic needle revoluble with reference to such a series of indices, and two compartments for the introduction of actuators, and six actuators, three with positively acting magnets and three with negatively acting magnets, the actuators being all similar in shape and each three having their magnets variously offset, we can cause the needle by means of the actuators, each of which may be placed in each compartment either side up, to point to any one of the twenty-four indices.

The element of chance enters into the use of the apparatus in that the actuators in the preferred form are all alike. In connection with the indices we may use a key. That is, there may be a set of horoscopes, or a set of fortunes, etc. which are known and which may be written or printed and each having an index as 1, 2, 3, etc. or *a*, *b*, *c*, etc. corresponding to one of the indices on the apparatus.

In the drawings,

Fig. 2 is a plan of the support, the dial and needle being removed, and one of the actuators being shown in position;

Fig. 3 is an elevation of what is shown in Fig. 1, partly broken away;

Figure 4:
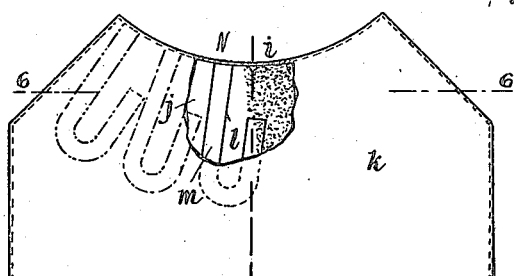
Figure 5:
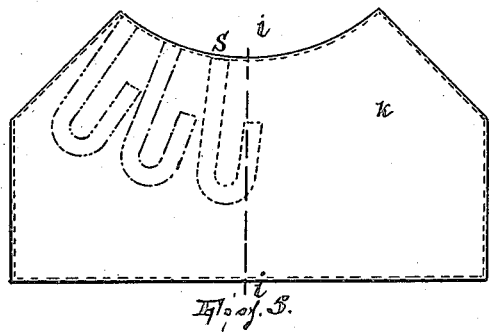
Figure 6:

Figs. 4 and 5 respectively show a positive and a negative actuator, they being respectively marked N. and S.; and Fig. 6 is a sectional view on the line 6—6 of Fig. 4.

The support includes a base *a* having a circular upstanding wall *b*. Upstanding from the base is a central boss *c* from which radiate, 90° apart, three walls *d*, the wall *b* being formed with a horizontal slot *e* between each two walls *d*, so that *c*, *d*, *e* form two radial and radially open compartments.

Figure 1:
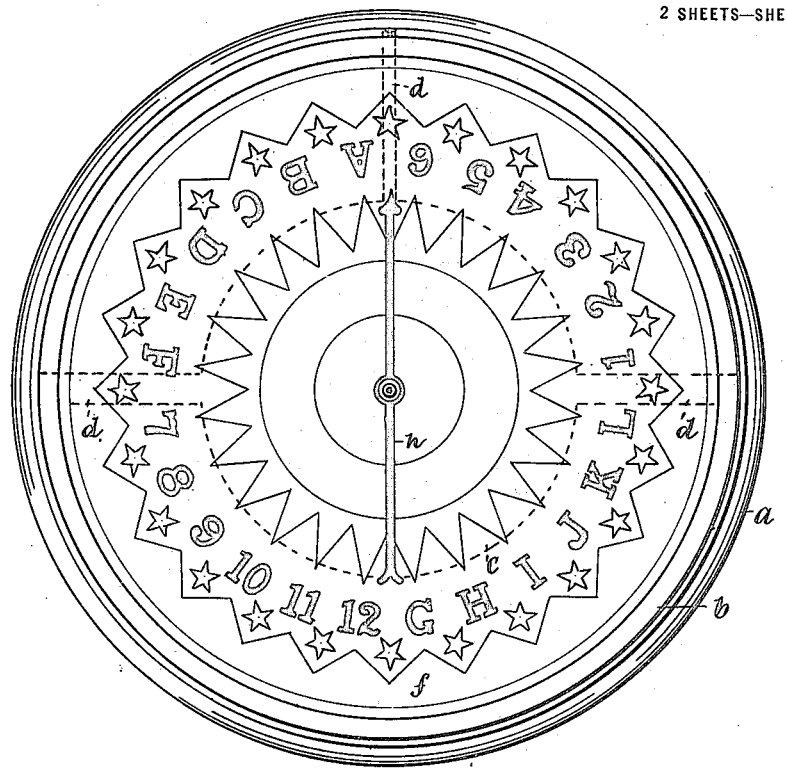
Figure 1 is a plan of the support, with its dial, and of the compass needle mounted thereon.

A dial $f$ is contained within the wall $b$ and has a circular series of indices placed thereon as shown in Fig. 1, there being in the present case twenty-four of these indices in alternating groups (six each) of consecutive numbers and letters of the alphabet. The support also includes a pivot $g$ upstanding centrally through the dial. On this pivot revolves a magnetic needle $h$, which of course normally tends to point to the north. There are two sets of actuators, three which are N. or positive and three which are S. or negative. The three which are N. may be made of one color and the other three of another color, if desired. In the present case they are all in the form of truncated sector-shaped plates; they are all identical in form, and moreover, each being adapted to be received in either of the compartments aforesaid, as shown in Fig. 2, the halves of each on opposite sides of a central axis $i\ i$ (which will then cross the series of indices) are reverse counterparts of each other so that each appears the same when placed in a compartment either side up. Each actuator contains a magnet concealed therein, and in each set (N. or S.) the magnets are arranged different distances from the axis $i\ i$ and are constructed and arranged so that in one set they will act positively and in the other set negatively. The following may be the construction of each actuator: A sector shaped plate $j$, as of cardboard, has a J-shaped slot $l$ cut therein from the edge (preferably arc-shaped) forming its truncation. In this is fitted a horseshoe magnet $m$ one leg of which (N. or S., according to the set to which the actuator belongs) is cut off, the other reaching to the said edge. Fig. 4 is intended to represent the relative positions of the three magnets in the N. set of actuators and Fig. 5 the relative positions of the magnets in the S. set of actuators. Each actuator is incased in a covering $k$ of paper (one color for one set and another color for the other) which conceals the presence and also the position of the magnet therein.

In view of the foregoing it will be obvious that with three such actuators of the N. kind and three of the S. kind the pointer may be moved to any of the twenty-four positions indicated by inserting the six actuators each in each of the compartments and first one side up and then the other side up, each actuator giving two positions of the pointer (attracted or repelled thereby, as the case may be) when placed first in one and then in the other compartment and two more positions when inverted and placed in said compartments one after the other.

We do not wish to be limited to the details hereinbefore set forth except as hereafter indicated in the claims.

Having thus fully described our invention, what we claim as new and desire to secure by Letters Patent is:—

1. A game apparatus including a support, a magnetic needle freely revoluble on said support, indices arranged in a line extending around the axis of the needle, said support having means to position actuators one at a time in the same radial relation to and remote from said axis, and a plurality of actuators to be positioned one at a time by said means, one actuator having concealed therein a positively acting member and the other having concealed therein a negatively acting member.

2. A game apparatus including a support, a controlled pointer member freely revoluble on said support, indices arranged in a line extending around the axis of the pointer, said support having means to position actuators one at a time in the same radial relation to and remote from said axis, and a plurality of outwardly similar actuators adapted to be positioned one at a time by said means, said actuators having controlling members concealed therein and offset different distances laterally thereof, and the controlled and each controlling member being one a magnet and the other a magnet-attracted element.

3. A game apparatus including a support, a magnetic needle freely revoluble on said support, indices arranged in a line extending around the axis of the needle, said support having means to position actuators one at a time in the same radial relation to and remote from said axis, and sets of outwardly similar actuators adapted to be positioned one at a time by said means, said actuators having controlling members concealed therein and offset different distances laterally thereof, and the controlling members of one set being positively acting magnets and those of the other set being negatively acting members.

4. In a game apparatus or the like, the combination of a support having a dial provided with a series of indices, a controlled pointer member freely movable on the support to different positions with respect to said indices, and an invertible actuator adapted to be placed near the pointer and with a definite axis thereof crossing said series and having its portions on opposite sides of its said axis reverse counterparts of each other and also having a controlling member concealed in and offset with respect to the axis of said device, one of said members being a magnet and the other a magnet-attracted element.

5. In a game apparatus or the like, the combination of a support having a dial provided with a series of indices, a controlled pointer member freely movable on the support to different positions with respect to said indices, a set of outwardly similar actuators adapted to be placed one at a time near the pointer and each with a definite axis thereof, positioned relatively the same in the several actuators, crossing said series, said actuators having controlling members concealed in and offset different distances from the respective axes thereof and the controlled and controlling members being one a magnet and the other a magnet-attracted element.

In testimony whereof we affix our signatures.

WILLIAM P. DUNN.
JOSEPH WM. BERESFORD.